US007870544B2

(12) United States Patent
Brokenshire et al.

(10) Patent No.: US 7,870,544 B2
(45) Date of Patent: Jan. 11, 2011

(54) INSURING MAXIMUM CODE MOTION OF ACCESSES TO DMA BUFFERS

(75) Inventors: Daniel A. Brokenshire, Round Rock, TX (US); John Kevin Patrick O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1316 days.

(21) Appl. No.: 11/278,759

(22) Filed: Apr. 5, 2006

(65) Prior Publication Data
US 2007/0240142 A1    Oct. 11, 2007

(51) Int. Cl.
*G06F 9/45* (2006.01)
(52) U.S. Cl. .................. 717/159; 717/151; 717/156
(58) Field of Classification Search ........................ None
See application file for complete search history.

(56) References Cited

U.S. PATENT DOCUMENTS

| | | | | |
|---|---|---|---|---|
| 5,367,651 | A * | 11/1994 | Smith et al. | 717/149 |
| 5,758,051 | A * | 5/1998 | Moreno et al. | 714/2 |
| 5,941,983 | A * | 8/1999 | Gupta et al. | 712/214 |
| 6,158,046 | A * | 12/2000 | Yoshida et al. | 717/151 |
| 6,247,143 | B1 * | 6/2001 | Williams | 714/11 |
| 6,260,189 | B1 * | 7/2001 | Batten et al. | 717/151 |
| 6,317,872 | B1 * | 11/2001 | Gee et al. | 717/152 |
| 6,381,740 | B1 * | 4/2002 | Miller et al. | 717/151 |
| 6,490,673 | B1 * | 12/2002 | Heishi et al. | 712/213 |
| 6,499,048 | B1 * | 12/2002 | Williams | 718/102 |
| 6,553,502 | B1 * | 4/2003 | Hurd et al. | 713/320 |
| 6,634,021 | B2 * | 10/2003 | Santhanam | 717/151 |
| 6,634,023 | B1 * | 10/2003 | Komatsu et al. | 717/159 |
| 6,748,589 | B1 * | 6/2004 | Johnson et al. | 717/150 |
| 6,779,114 | B1 * | 8/2004 | Chow et al. | 713/189 |
| 7,028,286 | B2 * | 4/2006 | Larin et al. | 717/106 |
| 7,207,032 | B1 * | 4/2007 | Verbitsky | 717/106 |
| 7,254,806 | B1 * | 8/2007 | Yates et al. | 717/136 |
| 2001/0011330 | A1 * | 8/2001 | Hughes et al. | 711/138 |
| 2002/0147969 | A1 * | 10/2002 | Lethin et al. | 717/138 |
| 2002/0147970 | A1 * | 10/2002 | Smith et al. | 717/140 |
| 2003/0145307 | A1 * | 7/2003 | Jahnke | 717/106 |
| 2004/0019770 | A1 * | 1/2004 | Kawahito | 712/227 |
| 2005/0246698 | A1 * | 11/2005 | Chung | 717/151 |
| 2008/0229295 | A1 * | 9/2008 | Brokenshire et al. | 717/153 |

OTHER PUBLICATIONS

Rob Oshana "Optimization Techniques for High-Performance DSPs" Embedded.com Jun. 7, 2003 <http://www.embedded.com/1999/9903/9903osha.htm> pp. 1-11.*
Peter Ewert Naraig Manjikan "Optimizing Software Performance for IP Frame Reassembly in an Integrated Architecture" ACM 2000 Ontario, Cannada pp. 1-9.*
"TMS320C6000 Optimizing Compiler v6.0 Beta User's Guide" Texas Instruments Incorporated 2005. pp. 1-284.*
"Cell Broadband Engine Architecture, Version 1.0" IBM Corporation, Aug. 8, 2005, www-128.ibm.com/developerworks/power/cell, pp. 1-319.

* cited by examiner

*Primary Examiner*—Michael J Yigdall
*Assistant Examiner*—Samuel Hayim
(74) *Attorney, Agent, or Firm*—Stephen R. Tkacs; Stephen J. Walder, Jr.; Matthew B. Talpis (57) ABSTRACT

A "kill" intrinsic that may be used in programs for designating specific data objects as having been "killed" by a preceding action is provided. The concept of a data object being "killed" is that the compiler is informed that no operations (e.g., loads and stores) on that data object, or its aliases, can be moved across the point in the program flow where the data object is designated as having been "killed." The "kill" intrinsic limits the reordering capability of an optimization scheduler of a compiler with regard to operations performed on "killed" data objects. The "kill" intrinsic may be used with DMA operations. Data objects being DMA'ed from a local store of a processor may be "killed" through use of the "kill" intrinsic prior to submitting the DMA request. Data objects being DMA'ed to the local store of the processor may be "killed" after verifying the transfer completes.

18 Claims, 5 Drawing Sheets

```
// Code example demonstrating the use of the _kill_data intrinsic.
// This example consists of a subroutine that decrypts a large, system
// memory message using an unspecified encryption algorithm. Because the
// message is significantly larger than local storage, the encrytion
// must be performed in sub-blocks.

include <stddef.h> extern void decrypt_block(char*block, int size, msg_key_t key);

static char msg_block_0[BLOCK_SIZE]_attribute_((aligned(128)));
static char msg_block_1[BLOCK_SIZE]_attribute_((aligned(128)));

void decrypt_message(unsigned int msg_in, int msg_size,
                     unsigned int msg_out, msg_key_t key)
{
  int size_0, size_1;

// Initiate transfer of first block.
  size_0 = (msg_size > BLOCK_SIZE) ? BLOCK_SIZE : msg_size;
  spu_mfcdma32(msg_block_0, msg_in, size_0, 0, MFC_GET_CMD);

while (msg_size) {
    msg_size -= size_0;
    msg_in += size_0;

// Initiate the next block transfer into block 1.
    size_1 = (msg_size > BLOCK_SIZE) ? BLOCK_SIZE : msg_size;
    spu_mfcdma32(msg_block_1, msg_in, size_1, 1, MFC_GETB_CMD);

// Wait for previous block transfer to complete.
    spu_writech(MFC_WrTagMask, 1<<0);
    (void)spu_mfcstat(MFC_TAG_UPDATE_ALL);
    _kill_data(msg_block_0);

// Decrypt the previous block (in place).
    decrypt_block(msg_block_0, size_0, key);
```

FIG. 3B
```
// Store decrypted message back out to system memory.
    spu_mfcdma32(msg_block_0, msg_out, size_0, 0, MFC_PUT_CMD);
    msg_out += size_0;

msg_size -= size_1;
    msg_in += size_1;

//Initiate the next block transfer into block 0.
    size_0 = (msg_size > BLOCK_SIZE) ? BLOCK_SIZE : msg_size;
    spu_mfcdma32(msg_block_0, msg_in, size_0, 0, MFC_GETB_CMD);

// Wait for previous block transfer to complete.
    spu_writech(MFC_WrTagMask, 1<<1);
    (void)spu_mfcstat(MFC_TAG_UPDATE_ALL);
    _kill_data(msg_block_1);

// Decrypt the previous block (in place).
    decrypt_block(msg_block_1, size_1, key);

//Store decrypted message back out to system memory.
    spu_mfcdma32(msg_block_1, msg_out, size_1, 1, MFC_PUT_CMD);
    msg_out += size_1;
  }

// Wait for all outstanding DMAs to complete.
spu_writech(MFC_WrTagMask, 3);
(void)spu_mfcstat(MFC_TAG_UPDATE_ALL);
_kill_data(msg_block_0);
_kill_data(msg_block_1);
}
```

INSURING MAXIMUM CODE MOTION OF ACCESSES TO DMA BUFFERS

BACKGROUND

1. Technical Field

The present application relates generally to an improved data processing device. More specifically, the present application is directed to an apparatus, method, and computer program product for ensuring maximum code motion of accesses to DMA buffers.

2. Description of Related Art

International Business Machines, Inc. has recently developed the next generation microprocessor architecture referred to as the Cell Broadband Engine processor architecture, referred to herein as the Cell processor. With this new architecture, a multiple core system-on-a-chip microprocessor is provided that comprises a master processor, referred to as the Power Processor Unit (PPU), and a plurality of co-processors, referred to as the Synergistic Processing Units (SPUs). Each SPU has an associated local storage device, referred to as the local store (LS), a message flow controller (MFC), and a bus interface unit (BIU). This combination of units is referred to as a Synergistic Processing Element (SPE). The details of the Cell Broadband Engine architecture are described in "Cell Broadband Engine Architecture V1.0" available from the DeveloperWorks website at www-128.ibm.com/developerworks/power/cell/.

The use of Synergistic Processing Elements (SPE) in the Cell processor provides many unique challenges that are not generally found in traditional processor designs. One particular challenge facing programmers of the SPE is ensuring correct ordering of data accesses to the SPE's local store (LS) direct memory access (DMA) buffers.

With the SPEs, both the SPU and the MFC may perform transactions on the local store. The SPU is a computational engine that may perform quadword loads and stores from and to the local store. The MFC is a DMA engine that may perform block data transfers between the local store and the effective addresses of the Cell processor's system memory. Typically, DMA transfers are initiated via a series of SPU channel writes to the MFC (see the "Cell Broadband Engine Architecture V1.0" document referenced above). The SPU then waits for the DMA request to complete before accessing the data transferred (in the case of a DMA "get" transfer), or storing new data to the local store DMA buffer for the subsequent transfer (in the case of a DMA "put" transfer).

The act of waiting for a DMA transfer to complete requires a channel write to the MFC_WrTagUpdate channel followed by a channel read of the MFC_RdTagStatus channel. The SPU C/C++ Language Extension Specification specifies that channel intrinsics (instructions) are to be treated as "volatile." The "volatile" keyword in C/C++ specifies that an object may be updated or modified in ways that are outside of the notice of the compiler. For instance, a memory location serving as a status register may be updated by a hardware device, such as an interface card. The volatile keyword tells the compiler to avoid optimizations on this variable, because such optimizations might interfere with its external modification. Thus, by specifying channel instructions as "volatile," the compiler is instructed to never reorder, such as for optimization purposes, the channel instructions with respect to each other.

However, this constraint on channel instructions does not ensure that SPU local store accesses to the transfer buffers are not reordered, such as by the optimizing scheduler, with respect to the wait for DMA completion channel commands. As a result, the SPU may be able to load data from DMA buffers whose contents have not been stored in the DMA buffers yet or may be able to store data over existing data that has not been written out to other storage yet.

The standard C language solution to this problem is to declare all DMA transfer buffers as "volatile." This linguistically will ensure that loads and stores to DMA buffers declared "volatile" will not be reordered with respect to the channel instructions. The problem with this solution is that it over constrains compiler scheduling and optimizations by making all loads and stores to these DMA buffers ordered when some of these loads and stores may be optimized, such as by caching or reordering the loads and stores, without detracting from the integrity of the DMA buffers.

SUMMARY

In one illustrative embodiment, a method in a data processing system is provided that comprises associating, in the code of a program, an instruction with a kill data object intrinsic specifying a data object of the instruction. The code of the program may be compiled including performing an optimization operation for reordering instructions in a program flow of the code. The reordering of instructions in the program flow of the code that operate on the data object may be restricted such that the instructions are not moved across a point in the program flow of the program where the data object is specified as having been killed by the kill data object intrinsic. Instructions in the program flow of the code that do not operate on the data object may be reordered by a compiler optimization scheduler. The kill data object intrinsic may specify a pointer to the data object.

The operation may be one of a load operation or a store operation to a storage device. For example, the operation may be a Direct Memory Access (DMA) "get" operation and the kill data object intrinsic may be placed prior to the wait instruction for waiting for the DMA "get" operation to complete. The operation may also be a Direct Memory Access (DMA) "put" operation and the kill data object intrinsic may be placed after the wait instruction for waiting for the DMA "put" operation to complete.

The reordering of instructions may be restricted by adding the data object to a killed data object list and using the killed data object list when optimizing the code for execution to determine if an instruction may be reordered. The data object may be added to the killed data object list by adding an entry to the killed data object list having a pointer to the data object and an identifier of a point in the code where the kill data object intrinsic associated with the data object is encountered.

The data object may be a Direct Memory Access (DMA) buffer. The DMA buffer may be one of a plurality of DMA buffers. Other DMA buffers may not be associated with a kill data object intrinsic The data processing system may be a system-on-a-chip. The system-on-a-chip may comprise a master processor and one or more co-processors.

In another illustrative embodiment, a computer program product comprising a computer useable medium having a computer readable program is provided. The computer readable program, when executed on a computing device, may cause the computing device to perform the method described above.

In yet another illustrative embodiment, an apparatus for optimizing code execution is provided. The apparatus may comprise a processor and a memory coupled to the processor. The memory may comprise instructions that, when executed by the processor, cause the processor to perform the method previously described above.

These and other features and advantages of the present invention will be described in, or will become apparent to those of ordinary skill in the art in view of, the following detailed description of the exemplary embodiments illustrative of the present invention.

BRIEF DESCRIPTION OF THE DRAWINGS

The novel features believed characteristic of an illustrative embodiment of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The following illustrative embodiments provide an apparatus, method and computer program product for ensuring maximum code motion of accesses to Direct Memory Access (DMA) buffers. The illustrative embodiment may be implemented in any processor design or architecture in which DMA buffers are utilized. One such processor design or architecture in which the exemplary aspects of the illustrative embodiments may be implemented is the Cell Broadband Engine (CBE) architecture available from International Business Machines, Inc. The CBE architecture is only exemplary of the possible processor architectures in which the illustrative embodiment may be implemented and the description of such in the following detailed description is not intended to state or imply any limitation with regard to the types of processor architectures in which the illustrative embodiment may be implemented.

Figure 1:
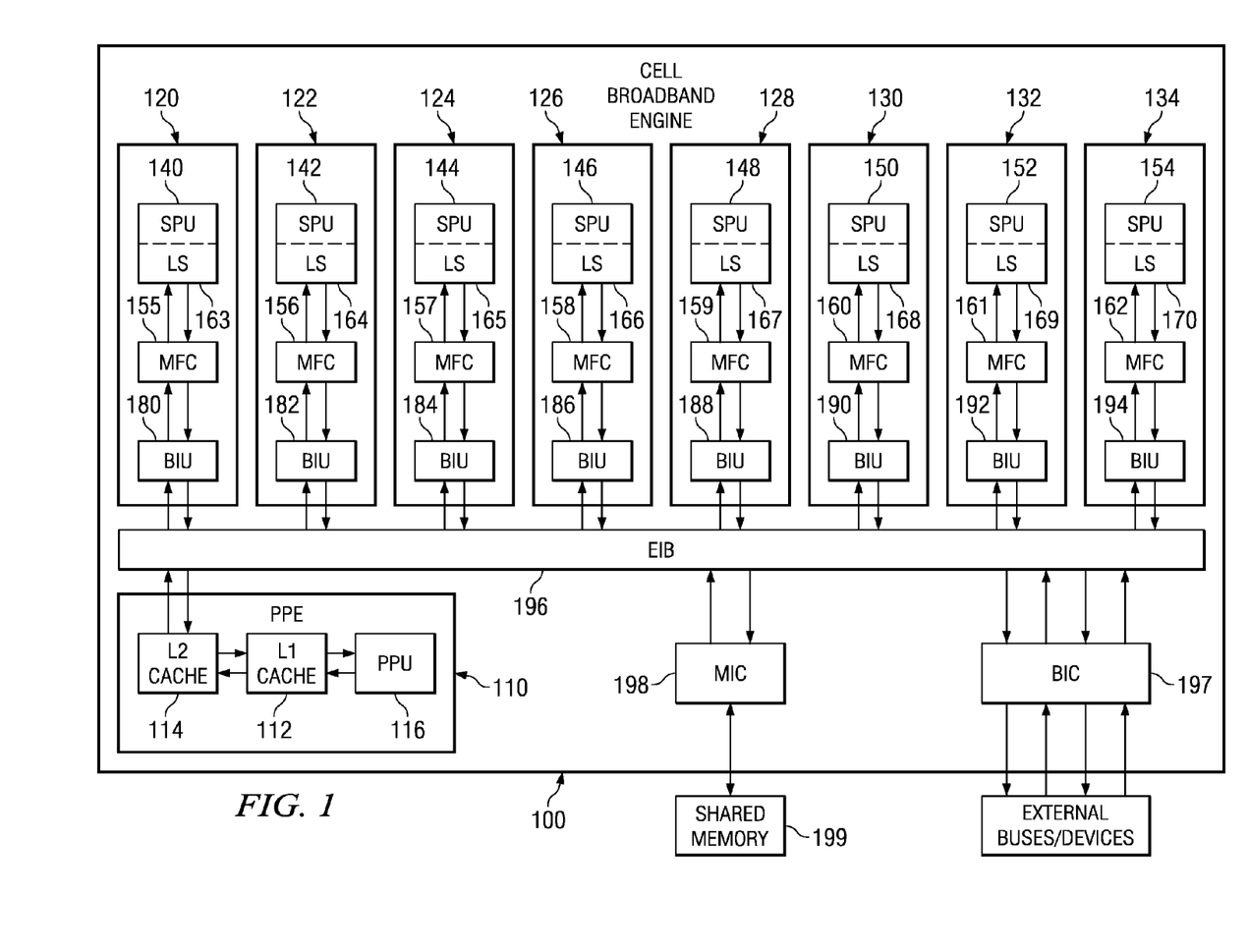
FIG. 1 is an exemplary block diagram of a microprocessor chip in which aspects of an illustrative embodiment may be implemented.

FIG. 1 is an exemplary block diagram of a microprocessor chip in which aspects of the illustrative embodiment may be implemented. The depicted microprocessor chip is one example of a CBE architecture in which exemplary aspects of the illustrative embodiment may be implemented. As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPUs execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With the mechanisms of the illustrative embodiments, a data object "kill" intrinsic is provided that may be used in programs for designating specific data objects as having been "killed" by a preceding action. The concept of a data object being "killed" is that the compiler is informed that no operations (e.g., loads and stores) on that data object, or its aliases, can be moved across the point in the program flow where the data object is designated as having been "killed." This, in a sense, temporarily designates operations on the data object as "volatile" without having to identify the data object as "volatile" in all instances and for all operations of the program. In other words, a barrier is created at the point in the program flow where the data object is designated as being "killed" that prevents operations on the "killed" data object from being reordered, by an optimization scheduler of the compiler, to a point prior to the barrier in the program flow.

The data object "kill" intrinsic may be represented as _kill_data (data_object_ptr). This _kill_data intrinsic provides a mechanism for the programmer to inform the compiler, i.e. the code generator, that the specified data object pointed to by the data object pointer <data_object_ptr> is killed and that no operations on that object or its aliases can be moved across that point in the program flow. It should be noted that while this intrinsic provides a notification functionality for notifying the compiler or code generator that the data object has been "killed" by the previous action on the data object, the _kill_data intrinsic does not itself generate any code.

The "kill" intrinsic may be used with DMA operations, such as DMA "get" and "put" operations, i.e. loads and stores, to DMA buffers of the SPEs in the Cell Broadband Engine microprocessor described previously. Specifically, data objects being DMA'ed from the local store of a SPE may be "killed" through use of the _kill_data intrinsic prior to submitting the DMA request. As a result, operations that may operate on the data object cannot be moved to a point in the program flow prior to the point at which the data object is "killed" and thus, the likelihood that the data object will be modified prior to the DMA request being completed is avoided.

Similarly, data objects being DMA'ed to the local store of the SPE may be "killed" after verifying the transfer completes. Thus, operations that would normally be performed after the data object is present in the local store are prevented from being moved to a point in the program flow that is prior to the completion of the transfer of the data object. In this way, accessing of the data object in the local store before it is present in the local store, such as by operations that have been reordered by an optimizing scheduler of the compiler, is avoided.

It should be noted that by using the _kill_data intrinsic, the DMA buffers of the local store of the SPE do not need to be designated as "volatile" in order to ensure that reordering of operations that may lead to corruption of data or improper operation of the program is avoided in the compiler. To the contrary, individual data objects may be designated as "killed" and such reordering optimizations may be specifically "turned off" with regard to operations on the "killed" data objects. Other DMA operations on the DMA buffers may be optimized by the compiler being limited by the "killed" state of other data objects.

Figure 2:
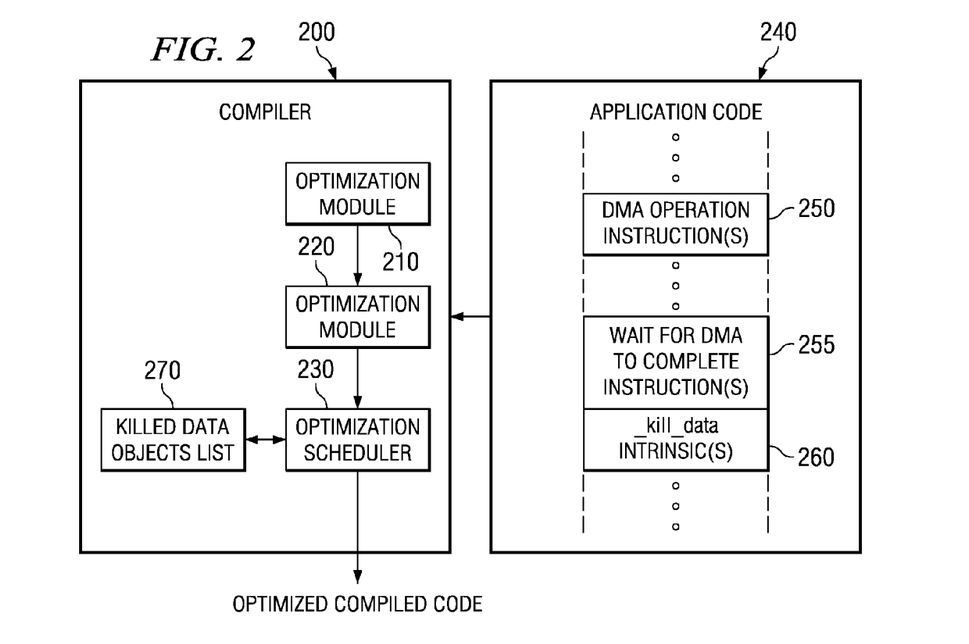
FIG. 2 is an exemplary diagram illustrating a compiler optimization scheduler in accordance with one illustrative embodiment.

FIG. 2 is an exemplary diagram illustrating a compiler optimization scheduler in accordance with one illustrative embodiment. As shown in FIG. 2, the compiler 200 includes a plurality of optimization modules 210-230, one of which is an optimization scheduler 230. The optimization scheduler 230 is responsible for identifying instructions in code that are not dependent instructions and which can be reordered so as to maximize performance, such as to take advantage of parallel processing and the like. The _kill_data intrinsic of the illustrative embodiments is used to inform the optimization scheduler 230 of the instructions, i.e. DMA operations, which cannot be reordered.

As mentioned above, while channel instructions are required to be designated as "volatile" and thus, cannot be reordered with respect to each other by operation of the optimization scheduler 230, the loads and stores to the local store by the SPU or MFC of the SPE are not limited in this manner. As a result, the compiler may schedule load or store instructions prior to the sequence of instructions that wait for a DMA to complete. This may lead to corruption of data and improper functioning of a program.

As shown in FIG. 2, the programmer may insert the _kill_data intrinsic 260 of the illustrative embodiments in the code 240 of the program in association with a DMA operation instruction 250. For example, if the DMA operation instruction 250 is a "get" DMA operation, then the _kill_data intrinsic 260 may be placed after the wait for the DMA operation to complete instructions 255 in the code 240. If the DMA operation instruction 250 is a "put" DMA operation, then the _kill_data intrinsic 260 may be placed after the wait for the DMA operation to complete instructions 255 in the code 240.

When the optimization scheduler 230 encounters the _kill_data intrinsic 260 in the code 240, the optimization scheduler 230 adds the data object pointer data_object_ptr and an identifier of the point in the code 240 where the _kill_data intrinsic 260 was encountered to a list 270 of data objects that have been "killed." The optimization scheduler 230, when determining how to reorder instructions so as to optimize the program flow of the code, identifies instructions that operate on "killed" data objects and does not permit these instructions to be reordered to a position prior to the _kill_data intrinsic 260 in the program flow. The identification of instructions that operate on "killed" data objects is facilitated by the "killed" data object list 270. Moreover, from the "killed" data object list 270, the optimization scheduler 230 may determine the point in the program flow before which instructions that operate on the "killed" data object cannot be reordered.

It should be noted that while the _kill_data intrinsic 260 is used to limit reordering of instructions that operate on the "killed" data objects, reordering of instructions that operate on other data objects is not limited. Thus, for example, a first DMA buffer in the local store of a SPE may be designated as being a "killed" data object while a second DMA buffer in the local store may not be a "killed" data object. As a result, instructions operating on the first DMA buffer may be restricted with regard to reordering by the optimization scheduler 230 while instructions operating on the second DMA buffer are not. Thus, rather than having to designate all DMA buffers as being "volatile" as in the prior art, the illustrative embodiments permit selective limiting of reordering of instructions.

Figure 3A:
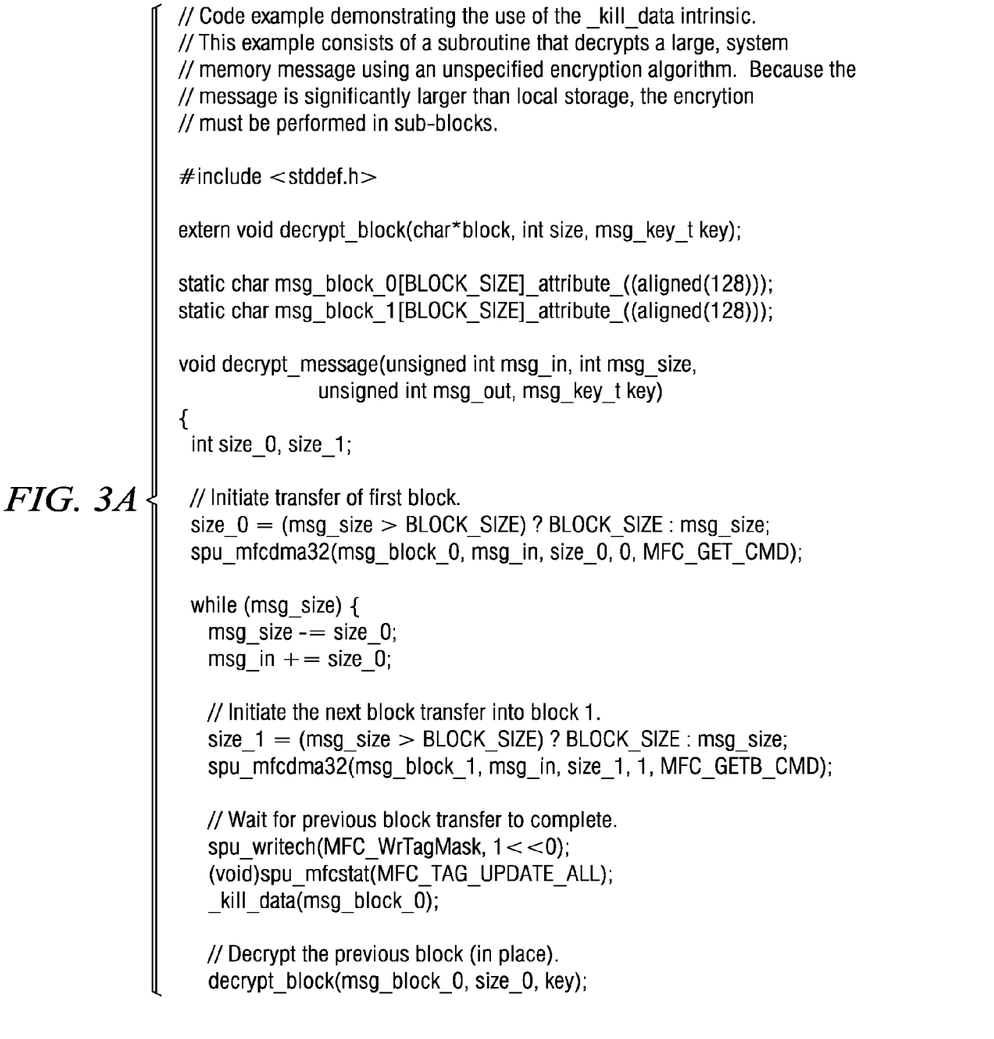
FIGS. 3A and 3B are exemplary diagrams illustrating a portion of code implementing the "kill" intrinsic according to one illustrative embodiment.
Figure 3B:
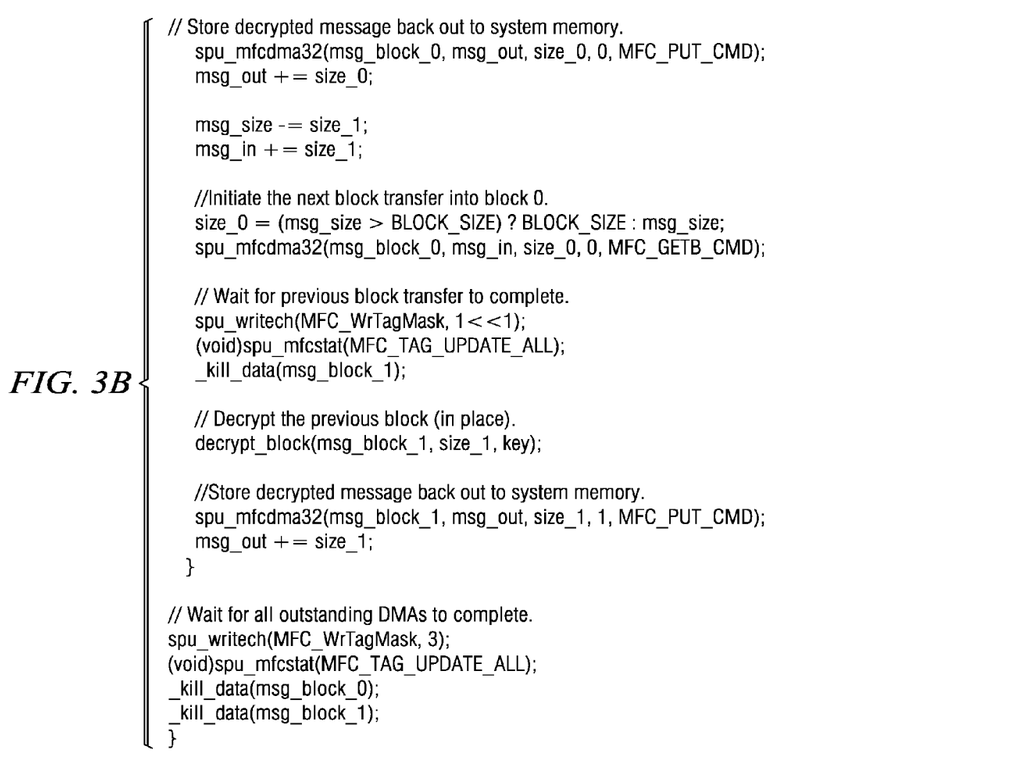

FIGS. 3A and 3B are exemplary diagrams illustrating a portion of code implementing the "kill" intrinsic according to one illustrative embodiment. In the depicted code, a subroutine that decrypts a large system memory message using an unspecified encryption algorithm is provided. Because the message is significantly larger than the local storage, the decryption is performed in sub-blocks.

As shown in FIGS. 3A and 3B, after initiating a block transfer, the code waits for the block transfer to complete. As shown, each _kill_data intrinsic is associated with a pair of data transfers, i.e. putting the previous iteration's decrypted block and getting the current iteration's encrypted block data.

As shown in FIGS. 3A and 3B, a first _kill_data intrinsic specifies msg_block_0 as the data object for which instructions may not be reordered. Thus, the subsequent decrypt_block (msg_block_0, size_0, key) instruction cannot be reordered prior to the _kill_data (msg_block_0) intrinsic in the program flow. Similarly, the second _kill_data intrinsic specifies msg_block_1 as an object for which instructions may not be reordered. Thus, the subsequent decrypt_block (msg_block_1, size_1, key) instruction cannot be reordered prior to the _kill_data (msg_block_1) intrinsic in the program flow.

Figure 4:
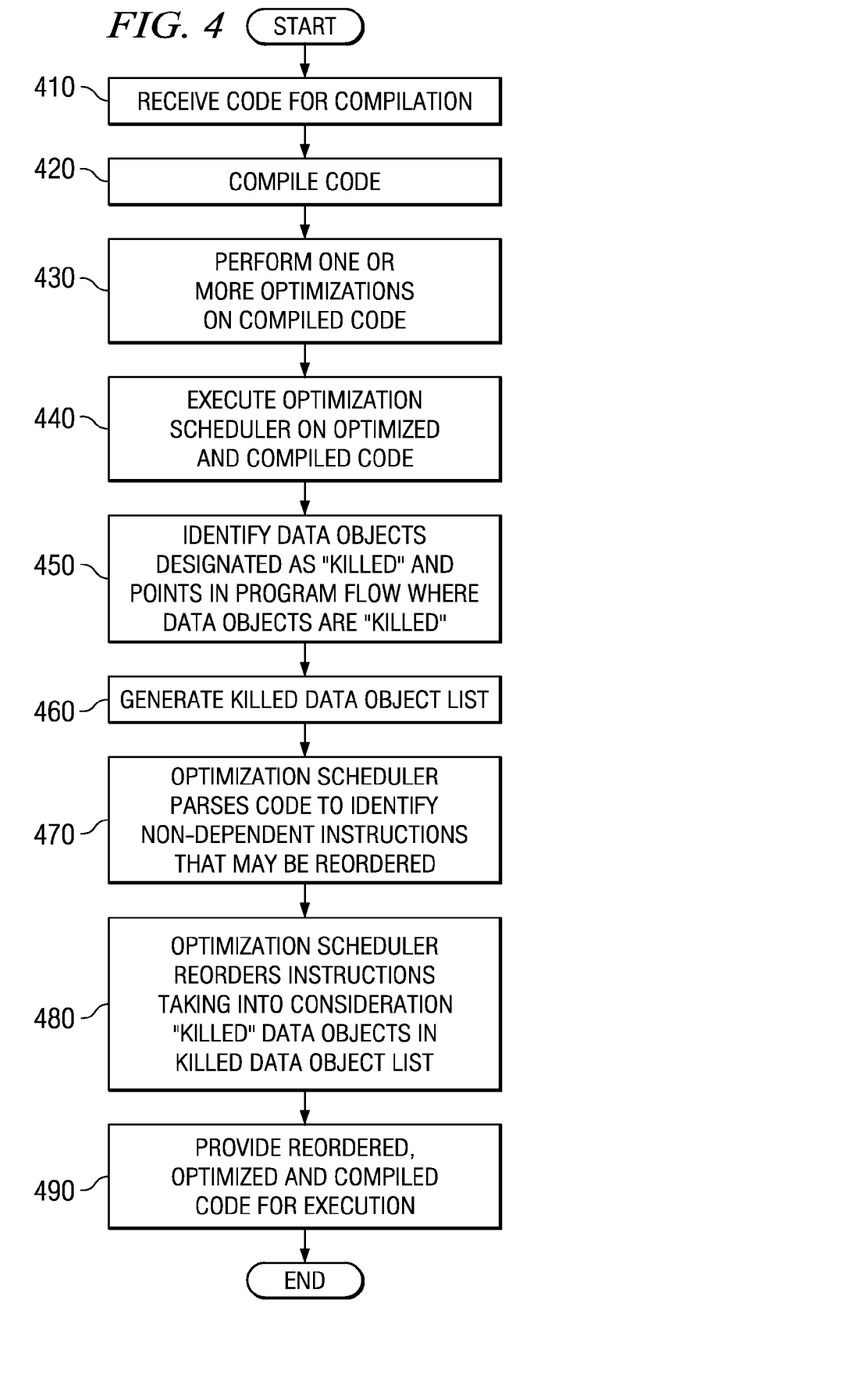
FIG. 4 is a flowchart outlining a compiler optimization operation in accordance with one illustrative embodiment.

FIG. 4 is a flowchart outlining a compiler optimization operation in accordance with one illustrative embodiment. It will be understood that each block, and combination of blocks, of the flowchart illustration in FIG. 4, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 4, the operation starts by receiving, in the compiler, code for compilation for execution on a SPE (step 410). The code is compiled (step 420) and one or more optimizations are performed on the compiled code (step 430). An optimization scheduler is then executed on the optimized and compiled code so as to determine an optimum program flow for the code (step 440). The optimization scheduler identifies data objects that are designated as "killed" and the points in the program flow where these data objects are identified as "killed" (step 450). The optimization scheduler generates a "killed" data object list that identifies which data objects are "killed" and the point in the program flow where these data objects are designated as "killed" (step 460).

The optimization scheduler parses the optimized and compiled code to identify non-dependent instructions that may be reordered to obtain a more efficient execution of the code (step 470). The optimization scheduler then reorders the instructions taking into consideration the "killed" data objects and the points in the program flow where the "killed" data objects are designated as having been "killed" (step 480). For example, instructions operating on the "killed" data objects are not permitted to be reordered to a point in the program flow prior to the point at which the "killed" data objects are designated as being "killed." The reordered optimized and compiled code is then provided for execution by the SPE (step 490) and the operation terminates.

Thus, the illustrative embodiments provide a mechanism by which selective data objects may be designated as "killed" so as to limit the reordering of operations in the program flow that operate on these "killed" data objects. The mechanisms of the illustrative embodiments may be utilized with DMA operations targeting the local store of an SPE, for example. In this way, the problems with loads and stores to a DMA buffer of a local store while a DMA operation is waiting to be completed are avoided.

As described above, the illustrative embodiments may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code in accordance with the illustrative embodiments is shown in FIG. 1 above. Such a data processing system may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing code execution, comprising:

associating, in the code of a program, an instruction with a kill data object intrinsic specifying a data object of the instruction, wherein the instruction is a wait instruction in the code of the program that is used to wait for completion of an operation, wherein if the operation is a Direct Memory Access (DMA) "get" operation then the kill data object intrinsic is placed prior to the wait instruction for waiting for the DMA "get" operation to complete, wherein if the operation is a DMA "put" operation then the kill data object intrinsic is placed after the wait instruction for waiting for the DMA "put" operation to complete, wherein the data object is a DMA buffer, wherein the DMA buffer is one of a plurality of DMA buffers, and wherein other DMA buffers are not associated with a kill data object intrinsic;

compiling the code of the program, wherein compiling the code of the program comprises performing an optimization operation for reordering instructions in a program flow of the code; and restricting reordering of instructions in the program flow of the code that operate on the data object such that the instructions are not moved across a point in the program flow of the program where the data object is specified as having been killed by the kill data object intrinsic, wherein restricting reordering of instructions in the program flow of the code that operate on the data object comprises adding an entry to the killed data object list having an identifier of a point in the code where the kill data object intrinsic associated with the data object is encountered and using the killed data object list when optimizing the code for execution to determine if an instruction may be reordered.

2. The method of claim 1, wherein the kill data object intrinsic defines a bather at a point in a program flow of the program that prevents operations on the data object from being reordered to a point prior to the barrier in the program flow.

3. The method of claim 1, wherein the operation is one of a load operation or a store operation to a storage device.

4. The method of claim 1, wherein instructions in the program flow of the code that do not operate on the data object are reordered by a compiler optimization scheduler.

5. The method of claim 1, wherein the kill data object intrinsic specifics a pointer to the data object.

6. The method of claim 1, wherein the data processing system is a system-on-a-chip that comprises a master processor and one or more co-processors.

7. A computer program product comprising a non-transitory computer useable medium having a computer readable program, wherein the computer readable program, when executed on a computing device, causes the computing device to:
associate, in the code of a program, an instruction with a kill data object intrinsic specifying a data object of the instruction, wherein the instruction is a wait instruction in the code of the program that is used to wait for completion of an operation, wherein if the operation is a Direct Memory Access (DMA) "get" operation then the kill data object intrinsic is placed prior to the wait instruction for waiting for the DMA "get" operation to complete, wherein if the operation is a DMA "put" operation then the kill data object intrinsic is placed after the wait instruction for waiting for the DMA "put" operation to complete, wherein the data object is a DMA buffer, wherein the DMA buffer is one of a plurality of DMA buffers, and wherein other DMA buffers are not associated with a kill data object intrinsic;
compile the code of the program, wherein compiling the code of the program comprises performing an optimization operation for reordering instructions in a program flow of the code; and
restrict reordering of instructions in the program flow of the code that operate on the data object such that the instructions are not moved across a point in the program flow of the program where the data object is specified as having been killed by the kill data object intrinsic, wherein restricting reordering of instructions in the program flow of the code that operate on the data object comprises adding an entry to the killed data object list having an identifier of a point in the code where the kill data object intrinsic associated with the data object is encountered and using the killed data object list when optimizing the code for execution to determine if an instruction may be reordered.

8. The computer program product of claim 7, wherein the kill data object intrinsic defines a barrier at a point in a program flow of the program that prevents operations on the data object from being reordered to a point prior to the barrier in the program flow.

9. The computer program product of claim 7, wherein the operation is one of a load operation or a store operation to a storage device.

10. The computer program product of claim 7, wherein instructions in the program flow of the code that do not operate on the data object are reordered by a compiler optimization scheduler.

11. The computer program product of claim 7, wherein the kill object intrinsic specifies a pointer to the data object.

12. The computer program product of claim 7, wherein the data processing system is a system-on-a-chip that comprises a master processor and one or more co-processors.

13. An apparatus for optimizing code execution, comprising:
a processor; and
a memory coupled to the processor, wherein the memory comprises instructions that, when executed by the processor, cause the processor to:
associate, in the code of a program, an instruction with a kill data object intrinsic specifying a data object of the instruction, wherein the instruction is a wait instruction in the code of the program that is used to wait for completion of an operation, wherein if the operation is a Direct Memory Access (DMA) "get" operation then the kill data object intrinsic is placed prior to the wait instruction for waiting for the DMA "get" operation to complete, wherein if the operation is a DMA "put" operation then the kill data object intrinsic is placed after the wait instruction for waiting for the DMA "put" operation to complete, wherein the data object is a DMA buffer, wherein the DMA buffer is one of a plurality of DMA buffers, and wherein other DMA buffers are not associated with a kill data object intrinsic;
compile the code of the program, wherein compiling the code of the program comprises performing an optimization operation for reordering instructions in a program flow of the code; and
restrict reordering of instructions in the program flow of the code that operate on the data object such that the instructions are not moved across a point in the program flow of the program where the data object is specified as having been killed by the kill data object intrinsic, wherein restricting reordering of instructions in the program flow of the code that operate on the data object comprises adding an entry to the killed data object list having an identifier of a point in the code where the kill data object intrinsic associated with the data object is encountered and using the killed data object list when optimizing the code for execution to determine if an instruction may be reordered.

14. The apparatus of claim 13, wherein the kill data object intrinsic defines a barrier at a point in a program flow of the program that prevents operations on the data object from being reordered to a point prior to the barrier in the program flow.

15. The apparatus of claim 13, wherein the operation is one of a load operation or a store operation to a storage device.

16. The apparatus of claim 13, wherein instructions in the program flow of the code that do not operate on the data object are reordered by a compiler optimization scheduler.

17. The apparatus of claim 13, wherein the kill data object intrinsic specifies a pointer to the data object.

18. The apparatus of claim 13, wherein the data processing system is a system-on-a-chip that comprises a master processor and one or more co-processors.

* * * * *